United States Patent
Spencer et al.

(10) Patent No.: US 9,619,924 B2
(45) Date of Patent: Apr. 11, 2017

(54) LIGHT TRANSPORT CLASSIFICATION BASED RAY TRACING

(71) Applicant: Disney Enterprises, Inc., Burbank, CA (US)

(72) Inventors: Benjamin Spencer, Los Angeles, CA (US); Brent Burley, Monterey Park, CA (US)

(73) Assignee: Disney Enterprises, Inc., Burbank, CA (US)

( * ) Notice: Subject to any disclaimer, the term of this patent is extended or adjusted under 35 U.S.C. 154(b) by 98 days.

(21) Appl. No.: 14/641,231

(22) Filed: Mar. 6, 2015

(65) Prior Publication Data
US 2016/0260242 A1    Sep. 8, 2016

(51) Int. Cl.
*G06T 15/06*    (2011.01)
*G06T 15/50*    (2011.01)

(52) U.S. Cl.
CPC .............. *G06T 15/06* (2013.01); *G06T 15/50* (2013.01)

(58) Field of Classification Search
CPC ..................................................... G06T 15/06
See application file for complete search history.

(56) References Cited

U.S. PATENT DOCUMENTS

| 7,773,088 B2 * | 8/2010 | Keller | G06T 15/06 345/426 |
| 8,022,950 B2 * | 9/2011 | Brown | G06T 15/06 345/426 |

OTHER PUBLICATIONS

Jul. 30, 2007, Wenzel, Accelerating the bidirectional path tracing algorithm using a dedicated intersection processor Jan. 31, 2011, DefinitionOfRay, Refracted ray is Transmitted ray Oct. 8, 2014, Dornbach, Implementation of bidirectional ray tracing algorithm.*

* cited by examiner

*Primary Examiner* — Devona Faulk
*Assistant Examiner* — Kevin Wu
(74) *Attorney, Agent, or Firm* — Farjami & Farjami LLP

(57) ABSTRACT

There is provided an illumination rendering system and method for use by such a system. The system includes a system processor, a system memory, and an illumination rendering engine including a ray tracing unit stored in the system memory. The system processor is configured to execute the ray tracing unit to recognize a present classification of a light path traveling between a ray source and a ray receiver, and to identify a scattering type of a next scattering event corresponding to a ray on the light path. The system processor is also configured to execute the ray tracing unit to determine a next classification of the light path based on the present classification of the light path and the scattering type.

20 Claims, 4 Drawing Sheets

LIGHT TRANSPORT CLASSIFICATION BASED RAY TRACING

BACKGROUND

Computer rendered graphics have come to play an important role in the production of a variety of entertainment content types. For example computer rendered graphics are regularly used in the creation of feature films and animation. As computer rendered graphics continue to be adopted for use across an increasingly broad spectrum of entertainment content types, artistic control of illumination, whether for the purposes of enhancing realism within a scene, or to creatively alter reality for artistic effect, becomes increasingly important.

SUMMARY

There are provided methods and systems for providing light transport classification based ray tracing, substantially as shown in and/or described in connection with at least one of the figures, and as set forth more completely in the claims.

DETAILED DESCRIPTION

Figure 1:
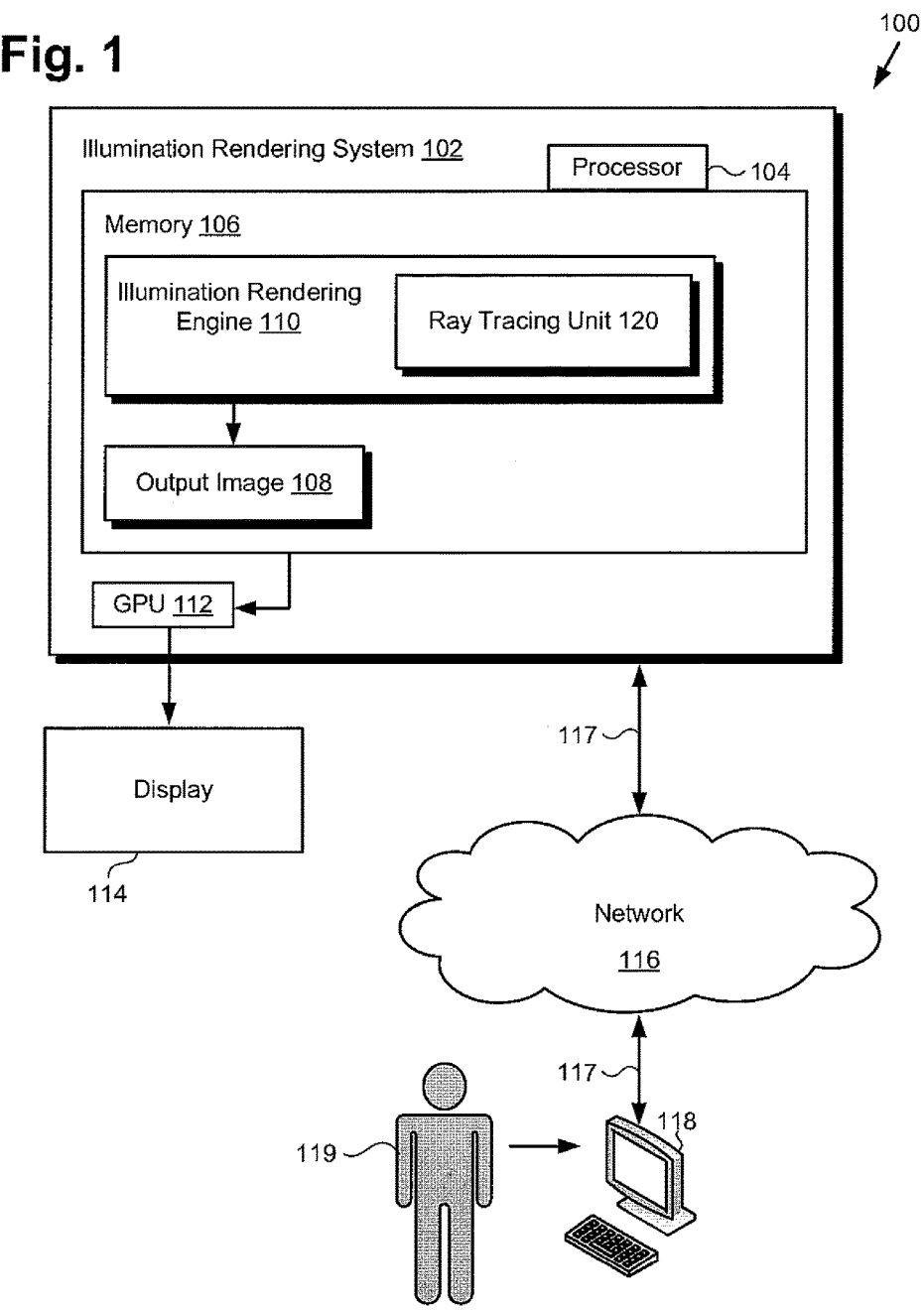
FIG. 1 shows a diagram of one exemplary implementation of an illumination rendering system configured to perform light transport classification based ray tracing.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, computer rendered graphics have come to play an important role in the production of a variety of entertainment content types. As computer rendered graphics continue to be adopted for use across an increasingly broad spectrum of entertainment content types, artistic control of illumination, whether for the purposes of enhancing realism within a scene, or to creatively alter reality for artistic effect, becomes increasingly important. The present application discloses a light transport classification based ray tracing solution that advantageously enables a significant reduction in the computational overhead associated with the rendering of illumination.

FIG. 1 shows a diagram of one exemplary implementation of an illumination rendering system configured to perform light transport classification based ray tracing. As shown in FIG. 1, illumination rendering environment 100 includes illumination rendering system 102, communications network 116, display 114, workstation terminal 118, and artist or user 119 utilizing workstation terminal 118. As further shown in FIG. 1, illumination rendering system 102 includes system processor 104 implemented as a hardware processor, graphics processing unit (GPU) 112, system memory 106 implemented as a non-transitory storage device for storing illumination rendering engine 110 including ray tracing unit 120 and output image 108. Also shown in FIG. 1 are network communication links 117 interactively connecting workstation terminal 118 and illumination rendering system 102 via communications network 116.

It is noted that although FIG. 1 depicts illumination rendering engine 110 and ray tracing unit 120 as being mutually co-located in system memory 106, that representation is merely provided as an aid to conceptual clarity. More generally, illumination rendering system 102 may include one or more computing platforms, such as computer servers for example, which may be co-located, or may form an interactively linked but distributed system, such as a cloud based system, for instance. As a result, system processor 104 and system memory 106 may correspond to distributed processor and memory resources within illumination rendering system 102. Thus, it is to be understood that illumination rendering engine 110 and ray tracing unit 120 may be stored remotely from one another within the distributed memory resources of illumination rendering system 102. It is further noted that although FIG. 1 depicts output image 108 as residing in system memory 106, in some implementations, output image 108, when completed, may be copied to non-volatile storage (not shown in FIG. 1.)

According to the implementation shown by FIG. 1, user 119 may utilize workstation terminal 118 to interact with illumination rendering system 102, over communications network 116. In one such implementation, illumination rendering system 102 may correspond to one or more web servers, accessible over a packet network such as the Internet, for example. Alternatively, illumination rendering system 102 may correspond to one or more computer servers supporting a local area network (LAN), or included in another type of limited distribution network. Moreover, in some implementations, communications network 116 may be a high-speed network suitable for high performance computing (HPC), for example a 10 GigE network or an Infiniband network.

Although workstation terminal 118 is shown as a personal computer (PC) in FIG. 1, that representation is also provided merely as an example. In other implementations, workstation terminal 118 may be any other suitable mobile or stationary computing device or system. User 119 may use workstation terminal 118 to direct the operation of illumination rendering engine 110 including ray tracing unit 120, under the control of system processor 104. Illumination rendering engine 110 is configured to utilize a final classification of a light path determined by ray tracing unit 120 to render an illumination of a scene including at least a portion of the light path as part of output image 108. Output image 108 may then be output to display 114 through GPU 112.

Figure 2:
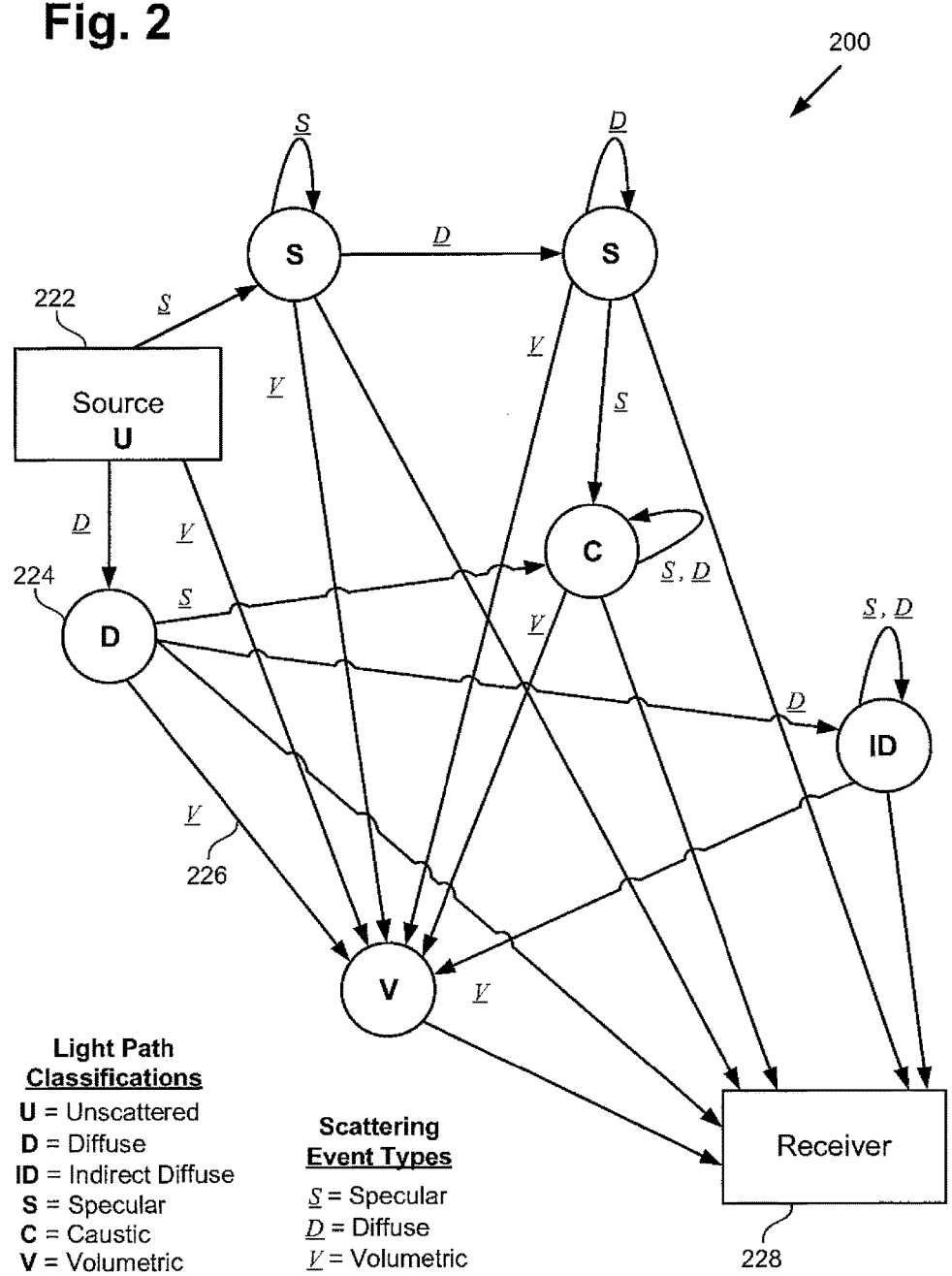
FIG. 2 shows a diagram of exemplary light transport classifications and exemplary transitions among those classifications, according to one implementation.

Referring to FIG. 2, FIG. 2 shows a diagram of exemplary light transport classifications, also referred to as light path classifications, and exemplary transitions of light paths among those classifications, according to one implementation. Light transport classification diagram 200 shows ray source 222 and ray receiver 228, as well as light transport classifications 224, of which exemplary diffuse (D) classification is indicated by reference number 224. Also shown in light transport classification diagram 200 are scattering event types 226, of which exemplary volumetric (V) scattering event type is indicated by reference number 226.

It is noted that light transport classifications 224 are represented in FIG. 2 as circles identified by bold capital letters, while scattering event types 226 causing transitions between light transport classifications 224 are represented as directional arrows identified by italicized and underlined letters. Thus, exemplary light transport classifications 224 include unscattered (U), diffuse (D), indirect diffuse (ID), specular (S), caustic (C), and volumetric (V), while exemplary scattering event types 226 may be characterized as diffuse (*D*), specular (*S*), and volumetric (*V*). All light paths coming from ray source 222 are classified as unscattered (U) prior to their first scattering event. Moreover, the final classification of a light path at ray receiver 228 is determined based on the scattering type of the final scattering event on its light path. As a result, arrival of each light path at ray receiver 228 is represented as an unlabeled directional arrow characterized by the light transport classification from which it is directed. It is further noted that the specific light transport classifications 224 and scattering event types 226 depicted in FIG. 2 are merely exemplary. Thus, in other implementations, there may be more, or fewer, light transport classifications 224 and/or scattering event types 226.

Light transport classifications 224 and scattering event types 226 will be discussed in greater detail below. However, it is noted that the scattering events represented in FIG. 2 are either volumetric interactions associated with a volumetric (*V*) scattering event type, or are surface interactions associated with one of a diffuse (*D*) or specular (*S*) scattering event type. Moreover, and by way of example of the transitions that may occur along a particular light path between ray source 222 and ray receiver 228, let us consider a light path experiencing an initial diffuse (*D*) scattering event type, causing the light path to be classified as diffuse (D). As shown in FIG. 2, at that stage on the light path, the diffuse light may either proceed directly to ray receiver 228, in which case it retains its diffuse (D) classification as its final light path classification, or it may experience a subsequent scattering event type.

According to exemplary light transport classification diagram 200, a light path classified as diffuse (D) may experience a subsequent, diffuse (*D*), specular (*S*), or volumetric (*V*) scattering event type. As further shown in FIG. 2, when a light path classified as diffuse (D) experiences a diffuse (*D*) scattering event type, the next light ray on the light path is classified as indirect diffuse (ID), a classification that will remain unchanged despite subsequent specular (*S*) and/or diffuse (*D*) scattering event types. Alternatively, when a light path classified as diffuse (D) experiences a subsequent specular (*S*) scattering event type, the next light ray on the light path is caustic (C), and subsequent light rays on that light path retain that classification despite experiencing subsequent specular (*S*) and/or diffuse (*D*) scattering event types. It is noted, however, that regardless of its light transport classification, when any light path experiences a volumetric (*V*) scattering event type in FIG. 2, the next ray on the path is classified as volumetric (V) and the light path retains that classification as its final classification. Other exemplary sequences of scattering event types 226 and the resulting transitions among light transport classifications 224 of light rays following light paths and experiencing those scattering event types are shown by light transport classification diagram 200.

Figure 3:
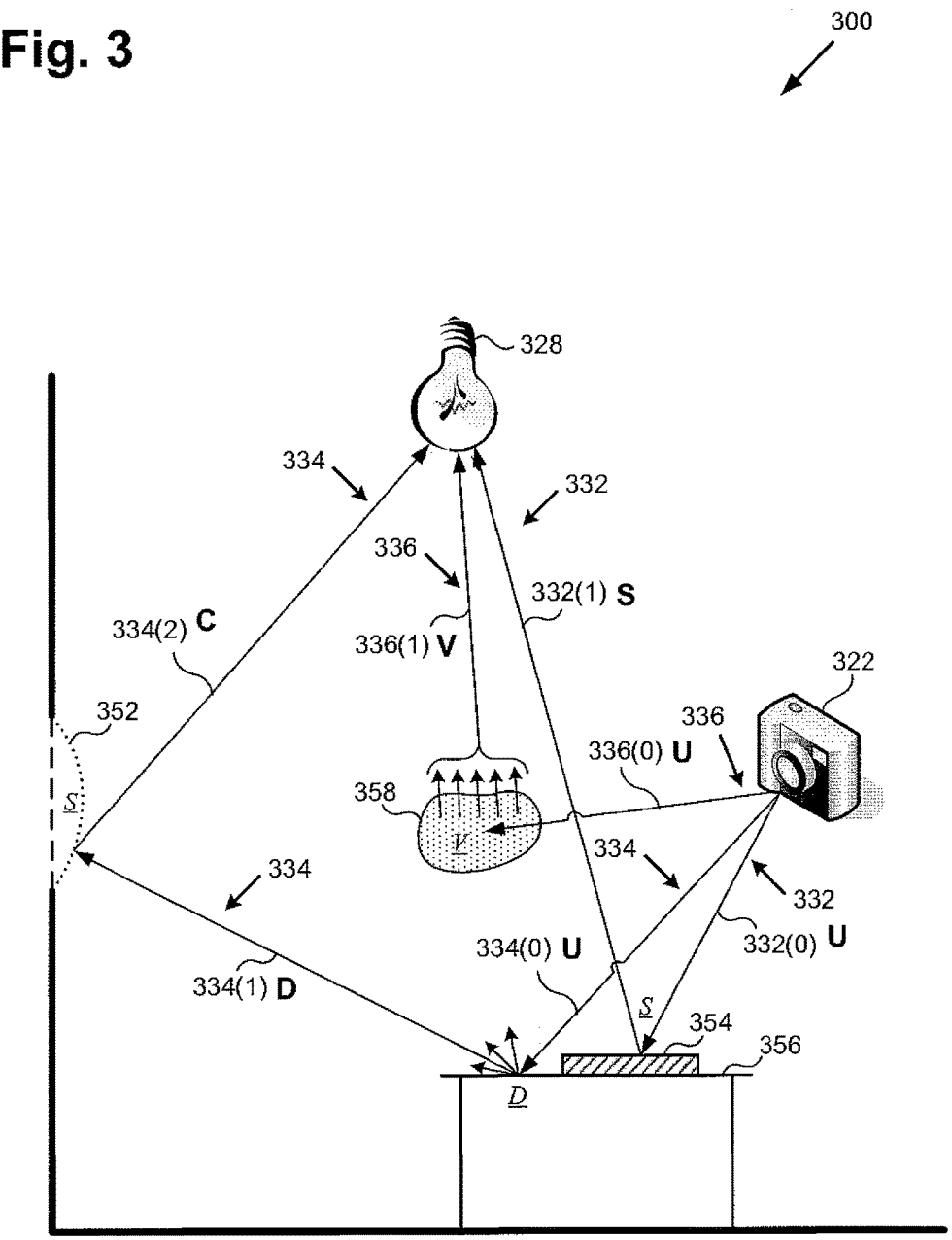
FIG. 3 shows a diagram of a scene depicting specific examples of light transport classification transitions, according to one implementation.

Continuing to FIG. 3, FIG. 3 shows a diagram of scene 300 depicting a specific example of light transport classification based ray tracing, according to one implementation. Scene 300 includes ray source 322, surfaces 352, 354, and 356, represented respectively as curved surface 352, reflective surface 354, and table surface 356, as well as volumetric region 358. Diagram 300 also includes light path 332 including rays 332(0) and 332(1), light path 334 including rays 334(0), 334(1), 334(2), and light path 336 including rays 336(0) and 336(1). That is to say, together, rays 332(0) and 332(1) identify light path 332 between ray source 322, shown as a perspective camera, and ray receiver 328, shown as a light source. Analogously, rays 334(0), 334(1), and 334(2) combine to identify light path 334 between ray source 322 and ray receiver 328, while rays 336(0) and 336(1) combine to identify light path 334 between ray source 322 and ray receiver 328.

It is noted that although rays 332(0), 332(1), 334(0), 334(1), 334(2), 336(0), and 336(1) are shown as identifying light paths from a perspective camera to a light source, it is reiterated that such a representation is shown for conceptual clarity. In other implementations, the light source shown in FIG. 3 may serve as ray source 322 and the perspective camera may serve as ray receiver 328. Moreover, in many implementations, the concepts discussed herein by reference to FIG. 3, as well as to FIG. 2, may be implemented bi-directionally. That is to say, a light path traveling from ray source 322 and another light path traveling from ray receiver 328 may be traced concurrently so as to join between ray source 322 and ray receiver 328 to form a single light path between ray source 322 and ray receiver 328.

Figure 4:
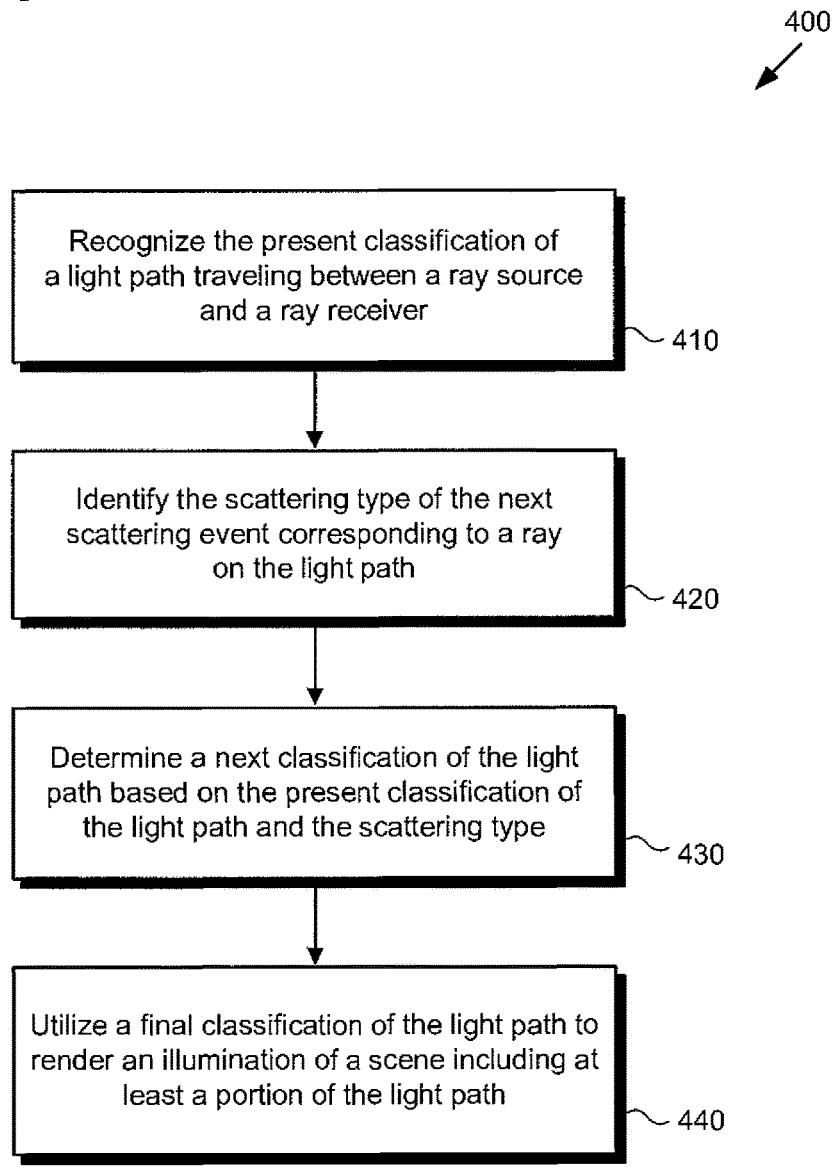
FIG. 4 is a flowchart presenting an exemplary method for use by an illumination rendering system to perform light transport classification based ray tracing.

FIGS. 1, 2, and 3 will be further described by reference to FIG. 4, which presents flowchart 400 describing one exemplary method for performing light transport classification based ray tracing. Flowchart 400 begins with recognizing the present classification of a light path traveling between a ray source and a ray receiver (action 410). Referring to FIG. 3, according to the implementation depicted in that figure, the light rays following light paths 332, 334, and 336 are produced as a result of emissions from ray source 322. Each of rays 332(0), 332(1), 332(2), 334(0), 334(1), and 334(2) is labeled with its light transport classification. It is noted that the parenthetical (0) denotes a ray depth of zero corresponding to a ray that has not experienced a scattering event, while the parentheticals (1) and (2) denote respective ray depths of one and two and correspond respectively to rays that have experienced first and second scattering events.

For example, and as shown in FIG. 3, the present classification of ray 334(1) after a first scattering event is diffuse (D). Moreover, the present classification of ray 334(0) before the first scattering event is unscattered (U), while the present classification of ray 334(2) after a second scattering event is caustic (C). Analogously, the present classification of ray 332(0) and the present classification of ray 336(0) is unscattered (U).

Scattering events may include surface interactions and volumetric interactions. A volumetric scattering event can occur when a light ray encounters a region of space in a scene that includes multiple light scattering objects having substantially similar scattering properties. For example, light ray 336(0) experiences volumetric scattering by volumetric region 358. Volumetric region 358 may correspond to a cloud of dust, a column of smoke, or a region of vapor or fog present in scene 300, for example. Surface interactions may include diffuse reflections or refractions that disperse incident light in multiple directions, and specular reflections or refractions in which substantially all or most of the incident light shares a common direction. Light ray 334(0) is shown to experience diffuse scattering from table surface 356, while light ray 332(0) is shown to experience specular scattering from reflective surface 354, which may be a mirror, for example.

Referring to FIG. 1 in combination with FIG. 3, recognizing the present classification of a light path may be performed by ray tracing unit 120 of illumination rendering engine 110, executed by system processor 104. For example, the present classification of each light path may be recognized by reading a ray data or label associated with each ray and carried by that ray. That is to say, recognition that the present classification of light path 334 at ray 334(1) may be performed by ray tracing unit 120 executed by system processor 104 through recognition of the label diffuse (D) applied to ray 334(1), as shown in FIG. 3.

Flowchart 400 continues with identifying the scattering type of the next scattering event corresponding to a ray on the light path (action 420). Referring specifically to ray 334(1), for example, the scattering type of the next scattering event occurring on light path 334 at surface 352 is specular (S) and corresponds to next light ray 334(2). Identifying the scattering type of the next scattering event on the path of the ray may be performed by ray tracing unit 120 of illumination rendering engine 110, executed by system processor 104. For example, the scattering type of the next scattering event on the path of the ray may be identified by reading a scattering type data or label associated with each scattering event. For instance recognition that the next scattering event of ray 334(1) on light path 334 will be specular may be performed by ray tracing unit 120 executed by system processor 104 through identification of the label specular (S) applied to surface 352, as shown in FIG. 3.

Flowchart 400 continues with determining the next classification of the light path based on the present classification of the light path and the scattering type (action 430). Referring to FIG. 2, according to exemplary light transport classification diagram 200, a light path classified as diffuse (D) that next experiences a specular (S) scattering event transitions to a next classification as caustic (C). Such a transition is shown as well in FIG. 3 when light ray 334(1) experiences a specular (S) scattering event at surface 352 corresponding to next light ray 334(2), causing light path 334 to have a next classification of caustic (C).

Determining the next classification of the light path may be performed by ray tracing unit 120 of illumination rendering engine 110, executed by system processor 104, through use of a light transport classification map corresponding to light transport classification diagram 200, in FIG. 2. Moreover, and as represented in FIG. 2, in some implementations, determination of the next classification of the light path may be based only on the present classification and the scattering event type. In other words, as shown in FIG. 2, any light path presently classified as specular (S) and experiencing a specular (S) scattering event type transitions to a next light path classification as caustic (C), regardless of its classification at other stages on its path, or the number of scattering events it experiences on that path. As further shown in FIG. 2, depending upon the present classification of the light path and the scattering event type of the next scattering event, the next classification of the light path can be any one of diffuse (D), specular (S), caustic (C), and volumetric (V).

It is noted that the exemplary set of possible light transport classifications represented in FIG. 2, as well as identification of the scattering type of a particular next scattering event and its corresponding next ray, may be performed stochastically, and may thus be probability dependent. In other words, during ray tracing, in some implementations system processor 104 is configured to execute ray tracing unit 120 to identify the scattering type of a next scattering event and its corresponding next ray stochastically. Moreover, in some implementations, system processor 104 may be configured to execute ray tracing unit 120 to utilize a Markov chain or another stochastic process having the Markov property to identify the scattering type of the next scattering event. By utilizing such a stochastic process to classify the light paths, the present solution can be implemented using a relatively small number of classification states to characterize a wide variety of scattering phenomena.

As shown by FIG. 3, at some stage on each light path, the next scattering event is the final scattering event on the path. Referring to light path 332, the next scattering event for ray 332(0) at reflective surface 354 is the final scattering event on light path 332. As a result, the next classification resulting from that last scattering event, i.e., specular (S) classification of next ray 332(1), is the final classification of light path 332 at ray source 322.

Moreover, and as discussed above, in some implementations it may be advantageous or desirable to perform the light transport classification based ray tracing method outlined in flowchart 400 bi-directionally, that is along a light path from perspective camera 322 to light source 328 and concurrently along a light path from light source 328 to perspective camera 322. In such a bi-directional implementation, a light path traveling from ray source 322 and another light path traveling from ray receiver 328 may be traced concurrently so as to join between ray source 322 and ray receiver 328 to form a single light path between ray source 322 and ray receiver 328, for example.

Exemplary flowchart 400 concludes with utilizing a final classification of the light path to render an illumination of a scene including at least a portion of the light path (action 440). For example, illumination rendering engine 110 including ray tracing unit 120 may be executed by system processor 104 to provide output image 108, which may correspond to a rendered illumination of scene 300. That illumination of scene 300 may be rendered using the final light transport classifications of light traveling on light paths 332, 334, 336. In other words illumination of scene 300 may be rendered using the light transport classification of one or more of respective light rays 332(1), 334(2), and 336(1). As a result, illumination rendering engine 110, under the control of system processor 104, can be configured to render detailed and subtle illumination effects, such as the caustic nature of light ray 334(2) after its scattering from curved surface 352, the volumetric nature of light ray 336(1) after its scattering through volumetric region 358, and the relatively directional nature of light ray 332(1) after its specular scattering from reflective surface 354.

When light transport classification is performed bi-directionally, as described above, the final classification of a light path formed through the joining of a light path from ray source 322 to ray receiver 328 with another light path from ray receiver 328 to ray source 322 may be based on a combination of the respective classifications of each light path. For example, in some implementations, all possible combinations of oppositely directed light paths may be determined, and each combination associated with a final light transport classification for the combined light path. As a result, in some implementations, the exemplary method of flowchart 400 may further include identifying another light path from ray receiver 328 to ray source 322, joining the two light paths to form a single joined light path, and determining a final classification of the joined light path based on the classification of the light path from ray source 322 to ray receiver 328 and the classification of the light path from ray receiver 328 to ray source 322.

Thus, the present application discloses systems and methods for providing light transport classification based ray tracing. By recognizing a present classification of a light path and identifying a scattering type of the next scattering event for a ray on the light path, implementations of the present systems and methods enable determination of the next classification of the light path after the scattering event. In addition, by utilizing a stochastic process to classify the light paths, the present solution can be implemented using a relatively small number of classification states to characterize a wide variety of scattering phenomena. Moreover, because the present techniques do not require a priori knowledge of the entire trajectory of a light path in order to render illumination based on its classification, the present solution advantageously enables a significant reduction in the computational overhead associated with illumination rendering.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An illumination rendering system comprising:
   a system processor;
   a system memory; and
   an illumination rendering engine including a ray tracing unit stored in the system memory;
   wherein the system processor is configured to execute the ray tracing unit to:
      recognize a present classification of a light path traveling between a ray source and a ray receiver;
      identify a scattering type of a next scattering event corresponding to a ray on the light path; and
      determine a next classification of the light path based only on the present classification of the light path and the scattering type;
   wherein the system processor utilizes the next classification of the light path to render an illumination of a scene on a display, the scene including at least a portion of the light path.

2. The illumination rendering system of claim 1, wherein the next scattering event is a final scattering event on the light path, the next classification being a final classification of the light path.

3. The illumination rendering system of claim 1, wherein the system processor is configured to execute the ray tracing unit to identify the scattering type of the next scattering event stochastically.

4. The illumination rendering system of claim 3, wherein the system processor is configured to execute the ray tracing unit to utilize a Markov chain to determine the scattering type of the next scattering event.

5. The illumination rendering system of claim 1, wherein the next scattering event is one of a surface interaction and a volumetric interaction.

6. The illumination rendering system of claim 1, wherein the scattering type of the next scattering event is one of diffuse, specular, and volumetric.

7. The illumination rendering system of claim 1, wherein the ray source comprises a camera and the ray receiver comprises a light source.

8. The illumination rendering system of claim 1, wherein the ray source comprises a light source and the ray receiver comprises a camera.

9. The illumination rendering system of claim 1, wherein the system processor is configured to execute the ray tracing unit to:
   identify another light path, the another light path traveling from the ray receiver to the ray source;
   join the another light path to the light path to form a joined light path; and
   determine a final classification of the joined light path based on a classification of each of the light path and the another light path.

10. A method for use by a system including a system processor and an illumination rendering engine including a ray tracing unit stored in a system memory, the method comprising:
    recognizing, by the ray tracing unit, a present classification of a light path traveling between a ray source and a ray receiver;
    identifying, by the ray tracing unit, a scattering type of a next scattering event corresponding to a ray on the light path;
    determining, by the ray tracing unit, a next classification of the light path based only on the present classification of the light path and the scattering type; and
    utilizing the next classification of the light path to render an illumination of a scene on a display, the scene including at least a portion of the light path.

11. The method of claim 10, wherein the next scattering event is a final scattering event on the light path, the next classification being a final classification of the light path.

12. The method of claim 10, wherein identifying the scattering type of the next scattering event comprises identifying the scattering type of the next scattering event stochastically.

13. The method of claim 12, wherein identifying the scattering type of the next scattering event comprises utilizing a Markov chain to identify the scattering type of the next scattering event.

14. The method of claim 10, wherein the next scattering event is one of a surface interaction and a volumetric interaction.

15. The method of claim 10, wherein the scattering type of the next scattering event is one of diffuse, specular, and volumetric.

16. The method of claim 10, wherein the ray source comprises a camera and the ray receiver comprises a light source.

17. The method of claim 10, wherein the ray source comprises a light source and the ray receiver comprises a camera.

18. The method of claim 10, further comprising:
    identifying another light path, the another light path traveling from the ray receiver to the ray source;
    joining the another light path to the light path to form a joined light path; and determining a final classification of the joined light path based on a classification of each of the light path and the another light path.

19. A method for use by a system including a system processor and an illumination rendering engine including a ray tracing unit stored in a system memory, the method comprising:
- recognizing, by the ray tracing unit, a present classification of a light path traveling between a ray source and a ray receiver;
- identifying, by the ray tracing unit, a scattering type of a next scattering event corresponding to a ray on the light path;
- determining, by the ray tracing unit, a next classification of the light path based only on the present classification of the light path and the scattering type, regardless of any prior classification of the light path; and
- utilizing the next classification of the light path to render an illumination of a scene on a display, the scene including at least a portion of the light path.

20. The method of claim 19, wherein the determining determines the next classification of the light path further regardless of any prior scattering event experienced on the light path.

\* \* \* \* \*